(12) United States Patent
Lainema

(10) Patent No.: US 7,263,125 B2
(45) Date of Patent: Aug. 28, 2007

(54) METHOD AND DEVICE FOR INDICATING QUANTIZER PARAMETERS IN A VIDEO CODING SYSTEM

(75) Inventor: Jani Lainema, Irving, TX (US)

(73) Assignee: Nokia Corporation, Espoo (FI)

( * ) Notice: Subject to any disclaimer, the term of this patent is extended or adjusted under 35 U.S.C. 154(b) by 698 days.

(21) Appl. No.: 10/421,629

(22) Filed: Apr. 23, 2003

(65) Prior Publication Data

US 2004/0013202 A1  Jan. 22, 2004

Related U.S. Application Data

(60) Provisional application No. 60/374,667, filed on Apr. 23, 2002.

(51) Int. Cl.
*H04N 7/12* (2006.01)
*G06K 9/36* (2006.01)

(52) U.S. Cl. ................... 375/240.04; 382/251

(58) Field of Classification Search .......... 375/240.04, 375/240.12, 240.16, 240.18, 240.25, 240.03; 341/107; 382/251
See application file for complete search history.

(56) References Cited

U.S. PATENT DOCUMENTS

| 5,054,103 | A | 10/1991 | Yasuda et al. ............ 382/56 |
| 5,144,426 | A | 9/1992 | Tanaka et al. ............ 358/133 |
| 5,231,484 | A | 7/1993 | Gonzales et al. .......... 358/133 |
| 5,237,410 | A * | 8/1993 | Inoue ................... 375/240.12 |
| 5,715,009 | A | 2/1998 | Tahara et al. ............ 348/423 |
| 5,751,358 | A | 5/1998 | Suzuki et al. ............ 348/405 |
| 6,256,349 | B1 | 7/2001 | Suzuki et al. .......... 375/240.18 |
| 6,677,868 | B2 * | 1/2004 | Kerofsky et al. .......... 341/107 |
| 2003/0152146 | A1 * | 8/2003 | Lin et al. .............. 375/240.16 |

OTHER PUBLICATIONS

"Joint Model No. 1 (JM-1)", Doc. JVT-A003, Appendix B; Joint Video Team (JVT) of ISO/IEC MPEG and ITU-T VCEG; Jan. 2002; pp. 1-79.

\* cited by examiner

*Primary Examiner*—Gims Philippe
(74) *Attorney, Agent, or Firm*—Ware, Fressola, Van Der Sluys & Adolphson, LLP

(57) ABSTRACT

A method and device for coding of digital video sequence, wherein an indication of quantization parameter (QP) is provided in the encoded bit-stream for decoding purposes. The QP related information is indicated by introducing a sequence level quantization parameter value SQP. More specifically, instead of coding the absolute values of picture/slice QPs, an indication of the difference ΔQP between the sequence level quantization parameter SQP and the picture/slice QP is provided. This eliminates the need to transmit a full QP for every picture/slice, and enables a statistically smaller difference value to be transmitted, thus providing a reduction in transmission bit-rate. The difference value is subsequently used in a corresponding decoder to reconstruct the picture/slice QP.

10 Claims, 8 Drawing Sheets

METHOD AND DEVICE FOR INDICATING QUANTIZER PARAMETERS IN A VIDEO CODING SYSTEM

This application is based on and claims priority to U.S. provisional application No. 60/374,667, filed Apr. 23, 2002.

FIELD OF THE INVENTION

The invention relates to a method, an encoder, a decoder and a device for the coding of digital video. More specifically, the invention relates to the indication of quantization parameter (QP) values in a video coding system.

BACKGROUND OF THE INVENTION

Digital video sequences, like ordinary motion pictures recorded on film, comprise a sequence of still images, the illusion of motion being created by displaying the images one after the other, typically at a rate between 15 and 30 frames per second.

Each frame of an uncompressed digital video sequence comprises an array of image pixels. In a commonly used digital video format, known as the Quarter Common Interchange Format (QCIF), a frame comprises an array of 176×144 pixels (i.e. 25,344 pixels). In turn, each pixel is represented by a certain number of bits, which carry information about the luminance and/or colour content of the region of the image corresponding to the pixel. Commonly, a so-called YUV colour model is used to represent the luminance and chrominance content of the image. The luminance, or Y, component represents the intensity (brightness) of the image, while the colour content of the image is represented by two chrominance or colour difference components, labelled U and V.

Colour models based on a luminance/chrominance representation of image content provide certain advantages compared with colour models that are based on a representation involving primary colours (that is Red, Green and Blue, RGB). The human visual system is more sensitive to intensity variations than it is to colour variations and YUV colour models exploit this property by using a lower spatial resolution for the chrominance components (U, V) than for the luminance component (Y). In this way, the amount of information needed to code the colour information in an image can be reduced with an acceptable reduction in image quality.

The lower spatial resolution of the chrominance components is usually attained by sub-sampling. Typically, each frame of a video sequence is divided into so-called "macroblocks", which comprise luminance (Y) information and associated chrominance (U, V) information, which is spatially sub-sampled. FIG. 1 illustrates one way in which macroblocks can be formed. As shown in FIG. 1, a frame of a video sequence represented using a YUV colour model, each component having the same spatial resolution. Macroblocks are formed by representing a region of 16×16 image pixels in the original image as four blocks of luminance information, each luminance block comprising an 8×8 array of luminance (Y) values and two, spatially corresponding, chrominance components (U and V) which are sub-sampled by a factor of two in both the horizontal and vertical directions to yield corresponding arrays of 8×8 chrominance (U, V) values. According to certain video coding recommendations, such as International Telecommunications Union (ITU-T) recommendation H.26L, the block size used within the macroblocks can be other than 8×8, for example 4×8 or 4×4 (see T. Wiegand, "Joint Model Number 1", Doc. JVT-A003, Joint Video Team (JVT) of ISO/IEC MPEG and ITU-T VCEG, January 2002, Sections 2.2 and 2.3). ITU-T recommendation H.26L also allows macroblocks to be organized together to form so-called "slices". More specifically, each slice is formed from a number of consecutive macroblocks in coding order and is encoded in such a way that it can be decoded independently without making reference to any other slice of the same frame. This arrangement is advantageous, as it tends to limit the propagation of artefacts in the decoded video that may arise due to transmission errors. While there is no specific limitation on the way in which slices may be constructed, one straightforward scheme is to group all the macroblocks in a single row of a frame together as a slice. This arrangement, together with the division of a QCIF format image into 16×16 macroblocks is illustrated in FIG. 2.

As can be seen from FIG. 2, a QCIF image comprises 11×9 macroblocks (in this case grouped into 9 slices of 11 consecutive macroblocks each). If the luminance blocks and chrominance blocks are represented with 8 bit resolution (that is by numbers in the range 0 to 255), the total number of bits required per macroblock is (16×16×8)+2×(8×8×8) =3072 bits. The number of bits needed to represent a video frame in QCIF format is thus 99×3072=304,128 bits. This means that the amount of data required to transmit/record/display an uncompressed video sequence in QCIF format, represented using a YUV colour model, at a rate of 30 frames per second, is more than 9 Mbps (million bits per second). This is an extremely high data rate and is impractical for use in video recording, transmission and display applications because of the very large storage capacity, transmission channel capacity and hardware performance required.

If video data is to be transmitted in real-time over a fixed line network such as an ISDN (Integrated Services Digital Network) or a conventional PSTN (Public Switched Telephone Network), the available data transmission bandwidth is typically of the order of 64 kbits/s. In mobile videotelephony, where transmission takes place at least in part over a radio communications link, the available bandwidth can be as low as 20 kbits/s. This means that a significant reduction in the amount of information used to represent video data must be achieved in order to enable transmission of digital video sequences over low bandwidth communication networks. For this reason, video compression techniques have been developed which reduce the amount of information transmitted while retaining an acceptable image quality.

Video compression methods are based on reducing the redundant and perceptually irrelevant parts of video sequences. The redundancy in video sequences can be categorised into spatial, temporal and spectral redundancy. "Spatial redundancy" is the term used to describe the correlation (similarity) between neighbouring pixels within a frame. The term "temporal redundancy" expresses the fact that objects appearing in one frame of a sequence are likely to appear in subsequent frames, while "spectral redundancy" refers to the correlation between different colour components of the same image.

There is often a significant amount of spatial redundancy between the pixels that make up each frame of a digital video sequence. In other words, the value of any pixel within a frame of the sequence is substantially the same as the value of other pixels in its immediate vicinity. Typically, video coding systems reduce spatial redundancy using a technique known as "block-based transform coding", in which a mathematical transformation, such as a two-dimensional Discrete Cosine Transform (DCT), is applied to blocks of image pixels. This transforms the image data from a representation comprising pixel values to a form comprising a set of coefficient values representative of spatial frequency components. This alternative representation of the image data reduces spatial redundancy significantly and thereby produces a more compact representation of the image data.

Frames of a video sequence which are compressed using block-based transform coding, without reference to any other frame within the sequence, are referred to as INTRA-coded or I-frames.

Generally, video coding systems not only reduce the spatial redundancy within individual frames of a video sequence, but also make use of a technique known as "motion-compensated prediction", to reduce the temporal redundancy in the sequence. Using motion-compensated prediction, the image content of some (often many) of the frames in a digital video sequence is "predicted" from one or more other frames in the sequence, known as "reference" frames. Prediction of image content is achieved by tracking the motion of objects or regions of an image between a frame to be coded (compressed) and the reference frame(s) using "motion vectors". As in the case of INTRA-coding, motion compensated prediction of a video frame is typically performed macroblock-by-macroblock.

Frames of a video sequence, compressed using motion-compensated prediction, are generally referred to as INTER-coded or P-frames. Motion-compensated prediction alone rarely provides a sufficiently precise representation of the image content of a video frame and therefore it is typically necessary to provide a so-called "prediction error" (PE) frame with each INTER-coded frame. The prediction error frame represents the difference between a decoded version of the INTER-coded frame and the image content of the frame to be coded. More specifically, the prediction error frame comprises values that represent the difference between pixel values in the frame to be coded and corresponding reconstructed pixel values formed on the basis of a predicted version of the frame in question. Consequently, the prediction error frame has characteristics similar to a still image and block-based transform coding can be applied in order to reduce its spatial redundancy and hence the amount of data (number of bits) required to represent it.

In order to illustrate the operation of a video coding system in greater detail, reference will now be made to FIGS. 3 and 4. FIG. 3 is a schematic diagram of a generic video encoder that employs a combination of INTRA- and INTER-coding to produce a compressed (encoded) video bit-stream. A corresponding decoder is illustrated in FIG. 4 and will be described later in the text.

The video encoder 100 comprises an input 101 for receiving a digital video signal from a camera or other video source (not shown). It also comprises a transformation unit 104 which is arranged to perform a block-based discrete cosine transform (DCT), a quantizer 106, an inverse quantizer 108, an inverse transformation unit 110, arranged to perform an inverse block-based discrete cosine transform (IDCT), combiners 112 and 116, and a frame store 120. The encoder further comprises a motion estimator 130, a motion field coder 140 and a motion compensated predictor 150. Switches 102 and 114 are operated co-operatively by control manager 160 to switch the encoder between an INTRA-mode of video encoding and an INTER-mode of video encoding. The encoder 100 also comprises a video multiplex coder 170 which forms a single bit-stream from the various types of information produced by the encoder 100 for further transmission to a remote receiving terminal or, for example, for storage on a mass storage medium, such as a computer hard drive (not shown).

Encoder 100 operates as follows. Each frame of uncompressed video provided from the video source to input 101 is received and processed macroblock by macroblock, preferably in raster-scan order. When the encoding of a new video sequence starts, the first frame to be encoded is encoded as an INTRA-coded frame. Subsequently, the encoder is programmed to code each frame in INTER-coded format, unless one of the following conditions is met: 1) it is judged that the current macroblock of the frame being coded is so dissimilar from the pixel values in the reference frame used in its prediction that excessive prediction error information is produced, in which case the current macroblock is coded in INTRA-coded format; 2) a predefined INTRA frame repetition interval has expired; or 3) feedback is received from a receiving terminal indicating a request for a frame to be provided in INTRA-coded format.

Operation of the encoder 100 in INTRA-coding mode will now be described. In INTRA-coding mode, the control manager 160 operates the switch 102 to accept video input from input line 118. The video signal input is received macroblock by macroblock and the blocks of luminance and chrominance values which make up each macroblock are passed to the DCT transformation block 104. Here a 2-dimensional discrete cosine transform is performed and a 2-dimensional array of DCT coefficients is formed for each block.

The DCT coefficients for each block are passed to the quantizer 106, where they are quantized using a quantization parameter QP. Selection of the quantization parameter QP is controlled by the control manager 160 via control line 115.

In more detail, quantization of the DCT coefficients is performed by dividing each coefficient value by the quantization parameter QP and rounding the result to the nearest integer. In this way the quantization process yields a set of quantized DCT coefficient values that have a reduced numerical precision compared with the coefficient values originally generated by DCT transformation block 104. Thus, in general, each of the quantized DCT coefficients may be represented by a smaller number of data bits than required to represent the corresponding coefficient before quantization. Furthermore, certain DCT coefficients are reduced to zero by the quantization process, thus reducing the number of coefficients that must be coded. Both these effects result in a reduction in the amount of data (i.e. data bits) required to represent the DCT coefficients for an image block. Thus, quantization provides a further mechanism by which the amount of data required to represent each image of the video sequence can be reduced. It also introduces an irreversible loss of information, which leads to a corresponding reduction in image quality. While this reduction in image quality may not always be desirable, quantization of DCT coefficient values does provide the possibility to adjust the number of bits required to encode a video sequence to take into account e.g. the bandwidth available for transmission of the encoded sequence or the desired quality of the coded video. More specifically, by increasing the value of QP used to quantize the DCT coefficients, a lower quality, but more compact representation of the video sequence can be created. Conversely, by reducing the value of QP, a higher quality but less compressed encoded bit-stream can be formed.

The quantized DCT coefficients for each block are passed from the quantizer 106 to the video multiplex coder 170, as indicated by line 125 in FIG. 1. The video multiplex coder 170 orders the quantized transform coefficients for each block using a zigzag scanning procedure, thereby converting the two-dimensional array of quantized transform coefficient values into a one-dimensional array. Typically, the video multiplex coder 170 next represents each non-zero quantized coefficient in the one-dimensional array by a pair of values, referred to as level and run, level being the value of the quantized coefficient and run being the number of consecutive zero-valued coefficients preceding the coefficient in question. The run and level values are further compressed using entropy coding. For example, a method such as variable length coding (VLC) may be used to produce a set of variable length codewords representative of each (run, level) pair.

Once the (run, level) pairs have been entropy (e.g. variable length) coded, the video multiplex coder 170 further combines them with control information, also entropy coded, for example, using a variable length coding method appropriate for the kind of information in question, to form a single compressed bit-stream of coded image information 135. It is this bit-stream, including the variable length codewords representative of the (run, level) pairs and control information relating, among other things, to the quantization parameter QP used for quantizing the DCT coefficients, which is transmitted from the encoder.

A locally decoded version of the macroblock is also formed in the encoder 100. This is done by passing the quantized transform coefficients for each block, output by quantizer 106, through inverse quantizer 108 and applying an inverse DCT transform in inverse transformation block 110. Inverse quantization is performed by reversing the quantization operation performed in quantizer 106. More specifically, inverse quantizer 108 attempts to recover the original DCT coefficient values for a given image block by multiplying each quantized DCT coefficient value by quantization parameter QP. Because of the rounding operation performed as part of the quantization process in quantizer 106, it is generally not possible to recover the original DCT coefficient values exactly. This results in a discrepancy between the recovered DCT coefficient values and those originally produced by DCT transformation block 104 (hence the irreversible loss of information referred to above).

The operations performed by inverse quantizer 108 and inverse transformation block 110 yield a reconstructed array of pixel values for each block of the macroblock. The resulting decoded image data is input to combiner 112. In INTRA-coding mode, switch 114 is set so that the input to the combiner 112 via switch 114 is zero. In this way, the operation performed by combiner 112 is equivalent to passing the decoded image data unaltered.

As subsequent macroblocks of the current frame are received and undergo the previously described encoding and local decoding steps in blocks 104, 106, 108, 110 and 112, a decoded version of the INTRA-coded frame is built up in frame store 120. When the last macroblock of the current frame has been INTRA-coded and subsequently decoded, the frame store 120 contains a completely decoded frame, available for use as a prediction reference frame in coding a subsequently received video frame in INTER-coded format. The flag indicating INTRA or INTER-code format is provided in line 122.

Operation of the encoder 100 in INTER-coding mode will now be described. In INTER-coding mode, the control manager 160 operates switch 102 to receive its input from line 117, which comprises the output of combiner 116. The combiner 116 receives the video input signal macroblock by macroblock from input 101. As combiner 116 receives the blocks of luminance and chrominance values which make up the macroblock, it forms corresponding blocks of prediction error information. The prediction error information represents the difference between the block in question and its prediction, produced in motion compensated prediction block 150. More specifically, the prediction error information for each block of the macroblock comprises a two-dimensional array of values, each of which represents the difference between a pixel value in the block of luminance or chrominance information being coded and a decoded pixel value obtained by forming a motion-compensated prediction for the block, according to the procedure described below.

The prediction error information for each block of the macroblock is passed to DCT transformation block 104, which performs a two-dimensional discrete cosine transform on each block of prediction error values to produce a two-dimensional array of DCT transform coefficients for each block.

The transform coefficients for each prediction error block are passed to quantizer 106 where they are quantized using a quantization parameter QP, in a manner analogous to that described above in connection with operation of the encoder in INTRA-coding mode. Again, selection of the quantization parameter QP is controlled by the control manager 160 via control line 115. The accuracy of prediction error coding can be adjusted depending on the available bandwidth and/or required quality of the coded video. In a typical Discrete Cosine Transform (DCT) based system this is done by varying the Quantizer Parameter (QP) used in quantizing the DCT coefficients the DCT coefficients to a specific accuracy.

The quantized DCT coefficients representing the prediction error information for each block of the macroblock are passed from quantizer 106 to video multiplex coder 170, as indicated by line 125 in FIG. 1. As in INTRA-coding mode, the video multiplex coder 170 orders the transform coefficients for each prediction error block using a zigzag scanning procedure and then represents each non-zero quantized coefficient as a (run, level) pair. It further compresses the (run, level) pairs using entropy coding, in a manner analogous to that described above in connection with INTRA-coding mode. Video multiplex coder 170 also receives motion vector information (described in the following) from motion field coding block 140 via line 126 and control information (e.g. including an indication of the quantization parameter QP) from control manager 160. It entropy codes the motion vector information and control information and forms a single bit-stream of coded image information, 135 comprising the entropy coded motion vector, prediction error and control information. The indication, qz, of the quantization parameter QP is provided to multiplex xoswe 170 via line 124.

The quantized DCT coefficients representing the prediction error information for each block of the macroblock are also passed from quantizer 106 to inverse quantizer 108. Here they are inverse quantized, in a manner analogous to that previously described in connection with operation of the encoder in INTRA-coding mode. In INTER-coding mode, the quality of the encoded video bit-stream and the number of bits required to represent the video sequence can be adjusted by varying the degree of quantization applied to the DCT coefficients representing the prediction error information.

The resulting blocks of inverse quantized DCT coefficients are applied to inverse DCT transform block 110, where they undergo inverse DCT transformation to produce locally decoded blocks of prediction error values. The locally decoded blocks of prediction error values are then input to combiner 112. In INTER-coding mode, switch 114 is set so that the combiner 112 also receives predicted pixel values for each block of the macroblock, generated by motion-compensated prediction block 150. The combiner 112 combines each of the locally decoded blocks of prediction error values with a corresponding block of predicted pixel values to produce reconstructed image blocks and stores them in frame store 120.

As subsequent macroblocks of the video signal are received from the video source and undergo the previously described encoding and decoding steps in blocks 104, 106, 108, 110, 112, a decoded version of the frame is built up in frame store 120. When the last macroblock of the frame has been processed, the frame store 120 contains a completely decoded frame, available for use as a prediction reference frame in encoding a subsequently received video frame in INTER-coded format.

Formation of a prediction for a macroblock of the current frame will now be described. Any frame encoded in INTER-coded format requires a reference frame for motion-compensated prediction. This means, necessarily, that when encoding a video sequence, the first frame to be encoded, whether it is the first frame in the sequence, or some other frame, must be encoded in INTRA-coded format. This, in turn, means that when the video encoder 100 is switched into INTER-coding mode by control manager 160, a complete reference frame, formed by locally decoding a previously encoded frame, is already available in the frame store 120 of the encoder. In general, the reference frame is formed by locally decoding either an INTRA-coded frame or an INTER-coded frame.

The first step in forming a prediction for a macroblock of the current frame is performed by motion estimation block 130. The motion estimation block 130 receives the blocks of luminance and chrominance values which make up the current macroblock of the frame to be coded via line 128. It then performs a block matching operation in order to identify a region in the reference frame which corresponds substantially with the current macroblock. In order to perform the block matching operation, motion estimation block accesses reference frame data stored in frame store 120 via line 127. More specifically, motion estimation block 130 performs block-matching by calculating difference values (e.g. sums of absolute differences) representing the difference in pixel values between the macroblock under examination and candidate best-matching regions of pixels from a reference frame stored in the frame store 120. A difference value is produced for candidate regions at all possible positions within a predefined search region of the reference frame and motion estimation block 130 determines the smallest calculated difference value. The offset between the macroblock in the current frame and the candidate block of pixel values in the reference frame that yields the smallest difference value defines the motion vector for the macroblock in question.

Once the motion estimation block 130 has produced a motion vector for the macroblock, it outputs the motion vector to the motion field coding block 140. The motion field coding block 140 approximates the motion vector received from motion estimation block 130 using a motion model comprising a set of basis functions and motion coefficients. More specifically, the motion field coding block 140 represents the motion vector as a set of motion coefficient values which, when multiplied by the basis functions, form an approximation of the motion vector. Typically, a translational motion model having only two motion coefficients and basis functions is used, but motion models of greater complexity may also be used.

The motion coefficients are passed from motion field coding block 140 to motion compensated prediction block 150. Motion compensated prediction block 150 also receives the best-matching candidate region of pixel values identified by motion estimation block 130 from frame store 120. Using the approximate representation of the motion vector generated by motion field coding block 140 and the pixel values of the best-matching candidate region from the reference frame, motion compensated prediction block 150 generates an array of predicted pixel values for each block of the macroblock. Each block of predicted pixel values is passed to combiner 116 where the predicted pixel values are subtracted from the actual (input) pixel values in the corresponding block of the current macroblock, thereby forming a set of prediction error blocks for the macroblock.

Operation of the video decoder 200, shown in FIG. 2 will now be described. The decoder 200 comprises a video multiplex decoder 270, which receives an encoded video bit-stream 135 from the encoder 100 and demultiplexes it into its constituent parts, an inverse quantizer 210, an inverse DCT transformer 220, a motion compensated prediction block 240, a frame store 250, a combiner 230, a control manager 260, and an output 280.

The control manager 260 controls the operation of the decoder 200 in response to whether an INTRA- or an INTER-coded frame is being decoded. An INTRA/INTER trigger control signal, which causes the decoder to switch between decoding modes is derived, for example, from picture type information associated with each compressed video frame received from the encoder. The INTRA/INTER trigger control signal is extracted from the encoded video bit-stream by the video multiplex decoder 270 and is passed to control manager 260 via control line 215.

Decoding of an INTRA-coded frame is performed macroblock-by-macroblock. The video multiplex decoder 270 separates the encoded information for the blocks of the macroblock from possible control information relating to the macroblock in question. The encoded information for each block of an INTRA-coded macroblock comprises variable length codewords representing the VLC coded level and run values for the non-zero quantized DCT coefficients of the block. The video multiplex decoder 270 decodes the variable length codewords using a variable length decoding method corresponding to the encoding method used in the encoder 100 and thereby recovers the (run, level) pairs. It then reconstructs the array of quantized transform coefficient values for each block of the macroblock and passes them to inverse quantizer 210. Any control information relating to the macroblock is also decoded in the video multiplex decoder using an appropriate decoding method and is passed to control manager 260. In particular, information relating to the level of quantization applied to the transform coefficients (i.e. quantization parameter QP) is extracted from the encoded bit-stream by video multiplex decoder 270 and provided to control manager 260 via control line 217. The control manager, in turn, conveys this information to inverse quantizer 210 via control line 218. Inverse quantizer 210 inverse quantises the quantized DCT coefficients for each block of the macroblock according to the control information relating to quantization parameter QP and provides the now inverse quantized DCT coefficients to inverse DCT transformer 220. The inverse quantization operation performed by inverse quantizer 210 is identical to that performed by inverse quantizer 108 in the encoder.

Inverse DCT transformer 220 performs an inverse DCT transform on the inverse quantized DCT coefficients for each block of the macroblock to form a decoded block of image information comprising reconstructed pixel values. The reconstructed pixel values for each block of the macroblock are passed via combiner 230 to the video output 280 of the decoder where, for example, they can be provided to a display device (not shown). The reconstructed pixel values for each block of the macroblock are also stored in frame store 250. Because motion-compensated prediction is not used in the encoding/decoding of INTRA coded macroblocks control manager 260 controls combiner 230 to pass each block of pixel values as such to the video output 280 and frame store 250. As subsequent macroblocks of the INTRA-coded frame are decoded and stored, a decoded frame is progressively assembled in the frame store 250 and thus becomes available for use as a reference frame for motion compensated prediction in connection with the decoding of subsequently received INTER-coded frames.

INTER-coded frames are also decoded macroblock by macroblock. The video multiplex decoder 270 receives the encoded video bit-stream 135 and separates the encoded prediction error information for each block of an INTER-coded macroblock from encoded motion vector information and possible control information relating to the macroblock in question. As explained in the foregoing, the encoded prediction error information for each block of the macroblock typically comprises variable length codewords representing the level and run values for the non-zero quantized transform coefficients of the prediction error block in question. The video multiplex decoder 270 decodes-the variable length codewords using a variable length decoding method corresponding to the encoding method used in the encoder 100 and thereby recovers the (run, level) pairs. It then reconstructs an array of quantized transform coefficient values for each prediction error block and passes them to inverse quantizer 210. Control information relating to the INTER-coded macroblock is also decoded in the video multiplex decoder 270 using an appropriate decoding method and is passed to control manager 260. Information relating to the level of quantization (QP) applied to the transform coefficients of the prediction error blocks is extracted from the encoded bit-stream and provided to control manager 260 via control line 217. The control manager, in turn, conveys this information to inverse quantizer 210 via control line 218. Inverse quantizer 210 inverse quantises the quantized DCT coefficients representing the prediction error information for each block of the macroblock according to the control information relating to quantization parameter QP and provides the now inverse quantized DCT coefficients to inverse DCT transformer 220. Again, the inverse quantization operation performed by inverse quantizer 210 is identical to that performed by inverse quantizer 108 in the encoder. The INTRA/INTER flag is provided in line 215.

The inverse quantized DCT coefficients representing the prediction error information for each block are then inverse transformed in the inverse DCT transformer 220 to yield an array of reconstructed prediction error values for each block of the macroblock.

The encoded motion vector information associated with the macroblock is extracted from the encoded video bit-stream 135 by video multiplex decoder 270 and is decoded. The decoded motion vector information thus obtained is passed via control line 225 to motion compensated prediction block 240, which reconstructs a motion vector for the macroblock using the same motion model as that used to encode the INTER-coded macroblock in encoder 100. The reconstructed motion vector approximates the motion vector originally determined by motion estimation block 130 of the encoder. The motion compensated prediction block 240 of the decoder uses the reconstructed motion vector to identify the location of a region of reconstructed pixels in a prediction reference frame stored in frame store 250. The region of pixels indicated by the reconstructed motion vector is used to form a prediction for the macroblock in question. More specifically, the motion compensated prediction block 240 forms an array of pixel values for each block of the macroblock by copying corresponding pixel values from the region of pixels identified in the reference frame. These blocks of pixel values, derived from the reference frame, are passed from motion compensated prediction block 240 to combiner 230 where they are combined with the decoded prediction error information. In practice, the pixel values of each predicted block are added to corresponding reconstructed prediction error values output by inverse DCT transformer 220. In this way, an array of reconstructed pixel values for each block of the macroblock is obtained. The reconstructed pixel values are passed to the video output 280 of the decoder and are also stored in frame store 250.

As subsequent macroblocks of the INTER-coded frame are decoded and stored, a decoded frame is progressively assembled in the frame store 250 and thus becomes available for use as a reference frame for motion-compensated prediction of other INTER-coded frames.

As described above, typical video encoding and decoding systems (commonly referred to as video codecs) are based on motion compensated prediction and prediction error coding. Motion compensated prediction is obtained by analyzing and coding motion between video frames and reconstructing image segments using the motion information. Prediction error coding is used to code the difference between motion compensated image segments and corresponding segments of the original image. The accuracy of prediction error coding can be adjusted depending on the available bandwidth and required quality of the coded video. In a typical Discrete Cosine Transform (DCT) based system this is done by varying the quantization parameter (QP) used in quantizing the DCT coefficients to a specific accuracy.

It should be noted that, in order to stay in synchronization with the encoder, the decoder has to know the exact value of the QP used in the coded video sequence. Typically, the QP value is transmitted once per slice leading to increase in the number of bits needed to encode the image. (As previously explained, a slice contains part of the image and is coded independently from other slices in order to avoid propagation of possible transmission errors inside the picture). For example, if the coding of a single QP value takes 6 bits and 20 images, each divided into 10 slices, are transmitted every second, 1.2 kbps is spent for the QP information alone.

Prior art solutions (for example, the H.26L video coding recommendation presented in the document by T. Wiegand, "Joint Model Number 1", Doc. JVT-A003, Joint Video Team (JVT) of ISO/IEC MPEG and ITU-T VCEG, January 2002) code the picture/slice QP parameters independently with a fixed or variable length code. This leads to increased transmission bit-rate as described above. More specifically, according to H.26L Joint Model Number 1, the quantization parameter value QP used in quantizing the DCT coefficient values is typically indicated in the encoded bit-stream at the beginning of each picture (see T. Wiegand, "Joint Model Number 1", Doc. JVT-A003, Joint Video Team (JVT) of ISO/IEC MPEG and ITU-T VCEG, January 2002, Section 3.3.1). If the macroblocks within a frame are arranged into slices then the QP value is also indicated at the beginning of each slice of the frame (e.g. in an optional slice header portion of the encoded bit-stream). In both cases, the QP value is indicated as such or is coded using an appropriate variable length coding scheme. As stated above, it should be realized that this scheme is very costly in terms of the number of bits required to represent the quantization parameter information, particularly in situations where frames are divided into many slices and/or the available bandwidth available for transmission of the encoded video sequence is low. This is a particularly significant problem in mobile video applications in which the encoded video bit-stream is transmitted over a radio communications link. In this situation, the bandwidth available for transmission of the encoded video bit-stream may be as low as 20 kbits/s and the QP information included in the bit-stream may represent a significant proportion of the overall available bandwidth.

Furthermore, according to H.26L, the value of QP may optionally be varied at the macroblock level by inserting a quantizer change parameter (Dquant) in the portion of the encoded bit-stream representative of the macroblock in question (see T. Wiegand, "Joint Model Number 1", Doc. JVT-A003, Joint Video Team (JVT) of ISO/IEC MPEG and ITU-T VCEG, January 2002, Section 3.4.7). This leads to a further increase in the amount of information in the encoded bit-stream that is devoted to the indication of QP related information.

In view of the foregoing, it should be realised that there is a significant need for an improved mechanism for indicating information relating to quantization parameter values in video coding systems.

SUMMARY OF THE INVENTION

The present invention improves prior art solutions for indicating QP related information by introducing a sequence level QP. This allows the encoder application to decide a video sequence dependent reference QP to be used in coding of the picture/slice QPs. Now, according to the invention, instead of coding the absolute values of picture/slice QPs, it is enough to code the difference between the reference sequence QP and the actually used picture/slice QP. In this way there is no need to transmit a full QP for every picture/slice, but a statistically smaller difference value is transmitted and used to reconstruct the picture/slice QP, thus leading to reduction in transmission bit-rate.

The bit-rate savings are most evident in the case of constant QP. In this case, it is sufficient to send just one bit per slice to indicate that the sequence QP is to be used when decoding the slice. For example, in the previously described example, the bit-rate for QP is reduced from 1.2 kbps to 0.2 kbps (now only one bit needs to be sent instead of six for each slice).

According to a first aspect of the invention, there is provided a method of encoding a digital video sequence, the method being applied in a video coding application to produce an encoded video bit-stream representative of the digital video sequence. The digital video sequence comprises a number of frames, each frame of the sequence comprising an array of pixels and is divided into a plurality of blocks, each block comprising a certain number of pixels. The method comprises encoding a frame of the digital video sequence by applying motion compensated prediction to blocks of pixels, thereby producing corresponding blocks of prediction error values. A transform coding technique is applied to the blocks of prediction error values to produce sets of transform coefficient values representative of the blocks of prediction error values and a level of quantization is applied to the sets of transform coefficient values to yield sets of quantized transform coefficient values. According to the invention, the method further comprises defining a default level of quantization to be used throughout encoding of the digital video sequence to quantize the sets of transform coefficient values.

Advantageously, the method according to the first aspect of the invention is also used to indicate quantization parameter (QP) values used to quantize sets of transform coefficient values representative of blocks of pixel values produced for frames coded in INTRA-coding mode in a manner analogous to that described above for indicating the quantization parameter values used to quantize sets of transform coefficient values representative of prediction error values produced for frames coded in INTER-coding mode.

Advantageously, the default level of quantization to be used throughout encoding of the digital video sequence is specific to the video sequence being encoded. Alternatively, the default level of quantization is specific to the video coding application.

Preferably, an indication of the default level of quantization to be used throughout encoding of the digital video sequence is provided. Even more preferably, an indication of the default level of quantization is provided in the encoded bit-stream representative of the digital video sequence. Advantageously, the encoded bit-stream, including the indication of the default level of quantization to be used throughout encoding of the digital video sequence, is transmitted to a video decoding device.

Advantageously, the default level of quantization to be used throughout encoding of the digital video sequence to quantize the sets of transform coefficient values can be updated during encoding of the digital video sequence and a further indication indicative of the updated default level of quantization is provided.

The indication of the updated default level of quantization is preferably transmitted to a video decoding device, advantageously, in the encoded bit-stream representative of the digital video sequence.

Advantageously, the level of quantization applied to said sets of transform coefficient values can be adjusted such that the actual level of quantization applied to the sets of transform coefficient values is different from the default level of quantization to be used throughout encoding of the video sequence. Preferably, the actual level of quantization applied is represented as a difference with respect to the default level of quantization. Advantageously, an indication of the difference with respect to the default level of quantization is provided in the encoded bit-stream representative of the digital video sequence.

In an embodiment of the video encoding method according to the first aspect of the invention, the level of quantization applied to the sets of transform coefficient values can be adjusted from one frame of the digital video sequence to another such that an actual level of quantization applied to the sets of transform coefficients for a particular frame of the digital video sequence is different from the default level of quantization to be used throughout encoding of the digital video sequence. Advantageously, in this embodiment, the actual level of quantization to be used in the particular frame is represented as a difference with respect to the default level of quantization and an indication of the difference with respect to the default level of quantization is provided in the encoded bit-stream representative of the digital video sequence.

In an alternative embodiment of the video encoding method according to the first aspect of the invention, the plurality of blocks into which a frame of the digital video sequence is divided are grouped into one or more segments and the level of quantization applied to the sets of transform coefficient values can be adjusted from one segment of a frame to another such that an actual level of quantization applied to the sets of transform coefficients for a particular segment of a frame is different from the default level of quantization to be used throughout encoding of the digital video sequence. Advantageously, in this alternative embodiment, the actual level of quantization to be used in the particular segment is represented as a difference with respect to the default level of quantization and an indication of the difference with respect to the default level of quantization is provided in the encoded bit-stream representative of the digital video sequence.

Advantageously, if the default level of quantization is to be used to quantize all sets of transform coefficient values throughout the digital video sequence, an indication of the default level of quantization is provided together with an indication that said default level is to be used to quantize all sets of transform coefficient values throughout the digital video sequence.

According to a second aspect of the invention, there is provided a method of decoding an encoded digital video sequence, the method being applied in a video decoding application to produce a decoded digital video sequence. The digital video sequence comprises a number of frames, each frame of the sequence comprising an array of pixels and being divided into a plurality of blocks, each block comprising a certain number of pixels, frames of the digital video sequence having been encoded by applying motion compensated prediction to blocks of pixels to produce corresponding blocks of prediction error values and applying a transform coding technique to the blocks of prediction error values to produce sets of transform coefficient values representative of the blocks of prediction error values and applying a level of quantization to the sets of transform coefficient values to yield sets of quantized transform coefficient values representative of the blocks of prediction error values. According to the invention, the decoding method comprises defining a default level of inverse quantization to be used throughout decoding of the encoded digital video sequence to inverse quantize the sets of quantized transform coefficient values.

Advantageously, the default level of inverse quantization is identical to a default level of quantization used to quantize the sets of transform coefficient values during encoding of the video sequence.

Advantageously, the default level of inverse quantization defined to be used throughout decoding of the encoded digital video sequence is specific to the encoded video sequence being decoded. Alternatively, the default level of inverse quantization is specific to the video decoding application.

Advantageously, the decoding method comprises retrieving an indication of the default level of inverse quantization, preferably from a bit-stream representative of the encoded digital video sequence.

Advantageously, the default level of inverse quantization can be updated during decoding of the digital video sequence. Preferably, updating of the default level of inverse quantization is performed responsive to an indication of an updated default level of quantization used during encoding of the video sequence, retrieved from a bit-stream representative of the encoded digital video sequence. Alternatively, the default level of inverse quantization is updated responsive to an indication of an updated default level of quantization used during encoding of the video sequence, transmitted from a video encoding device.

Advantageously, the level of inverse quantization applied to the sets of quantized transform coefficient values can be adjusted such that an actual level of inverse quantization applied to the sets of quantized transform coefficient values is different from the default level of inverse quantization to be used throughout decoding of the encoded digital video sequence. In this case, the actual level of inverse quantization is determined by adding a difference value to the default level of inverse quantization, the difference value being representative of the difference between the default level of inverse quantization and the actual level of inverse quantization to be applied. Preferably, an indication of the difference value is retrieved from a bit-stream representative of the encoded digital video sequence.

In an embodiment of the video decoding method according to the second aspect of the invention, the level of inverse quantization applied to the sets of quantized transform coefficient values is adjusted from one frame of the digital video sequence to another such that an actual level of inverse quantization applied to the sets of quantized transform coefficients for a particular frame of the digital video sequence is different from the default level of inverse quantization to be used throughout decoding of the encoded digital video sequence, Advantaegously, in this embodiment, the actual level of inverse quantization to be used in the particular frame is determined by adding a frame-specific difference value to the default level of inverse quantization, the frame-specific difference value being representative of the difference between the default level of inverse quantization and the actual level of inverse quantization to be used in the particular frame. Preferably, an indication of said frame-specific difference value is retrieved from a bit-stream representative of the encoded digital video sequence.

In an alternative embodiment of the video decoding method according to the second aspect of the invention, the plurality of blocks into which a frame of said digital video sequence is divided are grouped into one or more segments and the level of inverse quantization applied to the sets of quantized transform coefficient values is adjusted from one segment of a frame to another such that an actual level of inverse quantization applied to the sets of quantized transform coefficients for a particular segment of a frame is different from the default level of inverse quantization to be used throughout decoding of the encoded digital video sequence. Advantageously, in this alternative embodiment, the actual level of inverse quantization to be used in the particular segment is determined by adding a segment-specific difference value to the default level of inverse quantization, the segment-specific difference value being representative of the difference between the default level of inverse quantization and the actual level of inverse quantization to be used in the particular segment. Preferably, an indication of the segment-specific difference value is retrieved from a bit-stream representative of the encoded digital video sequence.

According to a third aspect of the invention, there is provided an encoder for encoding a digital video sequence to produce an encoded video bit-stream representative of the digital video sequence, the digital video sequence comprising a number of frames, each frame of the sequence comprising an array of pixels and being divided into a plurality of blocks, each block comprising a certain number of pixels. The video encoder according to the third aspect of the invention is arranged to encode a frame of the digital video sequence by applying motion compensated prediction to blocks of pixels, thereby producing corresponding blocks of prediction error values. It is further arranged to apply a transform coding technique to blocks of prediction error values to produce sets of transform coefficient values representative of said blocks of prediction error values and to apply a level of quantization to said sets of transform coefficient values to yield sets of quantized transform coefficient values. According to the invention, the video encoder is further arranged to define a default level of quantization to be used throughout encoding of the digital video sequence to quantize the sets of transform coefficient values.

Advantageously, the encoder according to the third aspect of the invention is also arranged to indicate quantization parameter (QP) values used to quantize sets of transform coefficient values representative of blocks of pixel values produced for frames coded in INTRA-coding mode in a manner analogous to that described above for indicating the quantization parameter values used to quantize sets of transform coefficient values representative of prediction error values produced for frames coded in INTER-coding mode.

Advantageously, the default level of quantization defined by the video encoder is specific to the video sequence being encoded.

Advantageously, the video encoder is further arranged to provide an indication of the default level of quantization in the encoded bit-stream representative of the digital video sequence. Even more advantageously, it is arranged to transmit the encoded bit-stream to a corresponding video decoder.

Advantageously the video encoder is further arranged to update the default level of quantization during encoding of the digital video sequence and to provide an indication of the updated default level of quantization. Preferably, the encoder is also arranged to transmit the indication of the updated default level of quantization to a corresponding video decoder. Advantageously, the encoder includes the indication of the updated default level of quantization in the encoded bit-stream representative of the digital video sequence.

Preferably, the video encoder is further arranged to adjust the level of quantization applied to the sets of transform coefficient values and thereby to apply an actual level of quantization that is different from the default level of quantization. Preferably, the video encoder is still further arranged to represent the actual level of quantization as a difference with respect to the default level of quantization and to provide an indication of the difference with respect to the default level of quantization in the encoded bit-stream representative of the digital video sequence.

In one embodiment, a video encoder according to the third aspect of the invention is arranged to adjust the level of quantization applied to the sets of transform coefficient values from one frame of the digital video sequence to another. In this way it is arranged to apply an actual level of quantization to the sets of transform coefficients for a particular frame that is different from the default level of quantization to be used throughout encoding of the digital video sequence. Advantageously, the video encoder according to this embodiment is further arranged to represent the actual level of quantization to be used in the particular frame as a difference with respect to the default level of quantization and to provide an indication of the difference with respect to the default level of quantization in the encoded bit-stream representative of the digital video sequence.

In an alternative embodiment, a video encoder according to the third aspect of the invention is further arranged to group the plurality of blocks into which a frame of the digital video sequence is divided into one or more segments and to adjust the level of quantization applied to the sets of transform coefficient values from one segment of a frame to another. In this way the video encoder is arranged to apply an actual level of quantization to the sets of transform coefficients for a particular segment of a frame that is different from the default level of quantization to be used throughout encoding of the digital video sequence. Advantageously, the video encoder according to this alternative embodiment is further arranged to represent the actual level of quantization to be used in the particular segment as a difference with respect to the default level of quantization and to provide an indication of the difference with respect to the default level of quantization in the encoded bit-stream representative of the digital video sequence.

In a particular embodiment, the video encoder is arranged to provide an indication of the default level of quantization and an indication that the default level is to be used to quantize all sets of transform coefficient values throughout the digital video sequence.

Advantageously, the video encoder according to the third aspect of the invention is provided in a multimedia terminal. Even more preferably, it is implemented in a radio telecommunications device.

According to a fourth aspect of the invention, there is provided a decoder for decoding an encoded digital video sequence to produce a decoded digital video sequence. The digital video sequence comprises a number of frames, each frame of the sequence comprising an array of pixels and being divided into a plurality of blocks, each block comprising a certain number of pixels, frames of the digital video sequence having been encoded by applying motion compensated prediction to blocks of pixels to produce corresponding blocks of prediction error values and applying a transform coding technique to the blocks of prediction error values to produce sets of transform coefficient values representative of said blocks of prediction error values and applying a level of quantization to the sets of transform coefficient values to yield sets of quantized transform coefficient values representative of the blocks of prediction error values. According to the invention, the video decoder is arranged to define a default level of inverse quantization to be used throughout decoding of the encoded digital video sequence to inverse quantize the sets of quantized transform coefficient values.

Preferably, the default level of inverse quantization is identical to a default level of quantization used to quantize the sets of transform coefficient values during encoding of the video sequence.

Advantageously, the default level of inverse quantization defined to be used throughout decoding of the encoded digital video sequence is specific to the encoded video sequence being decoded.

Advantageously, the video decoder is arranged to retrieve an indication of the default level of inverse quantization, preferably from a bit-stream representative of the encoded digital video sequence.

Advantageously, the video decoder is arranged to update the default level of inverse quantization during decoding of the digital video sequence, preferably by retrieving an indication of an updated default level of quantization from a bit-stream representative of the encoded digital video sequence. Alternatively, the video decoder is arranged to receive an indication of an updated default level of quantization transmitted from a video encoding device.

Preferably, the video decoder is arranged to adjust the level of inverse quantization applied to the sets of quantized transform coefficient values and to apply an actual level of inverse quantization to the sets of quantized transform coefficient values that is different from the default level of inverse quantization. Advantageously, the decoder is arranged to determine the actual level of inverse quantization by adding a difference value to the default level of inverse quantization, the difference value being representative of the difference between the default level of inverse quantization and the actual level of inverse quantization to be applied. Preferably, the video decoder is arranged to retrieve an indication of the difference value from a bit-stream representative of the encoded digital video sequence.

In one embodiment, a video decoder according to the fourth aspect of the invention is arranged to adjust the level of inverse quantization applied to the sets of quantized transform coefficient values from one frame of the digital video sequence to another and to apply an actual level of inverse quantization to the sets of quantized transform coefficients for a particular frame of the digital video sequence that is different from the default level of inverse quantization to be used throughout decoding of the encoded digital video sequence. Advantageously, the decoder is arranged to determine the actual level of inverse quantization to be used in the particular frame by adding a frame-specific difference value to the default level of inverse quantization, the frame-specific difference value being representative of the difference between the default level of inverse quantization and the actual level of inverse quantization to be used in the particular frame. Preferably, the video decoder is arranged to retrieve an indication of the frame-specific difference value from a bit-stream representative of the encoded digital video sequence.

In an alternative embodiment, a video decoder according to the fourth aspect of the invention is arranged to decode an encoded video sequence in which the plurality of blocks into which a frame of said digital video sequence is divided are grouped into one or more segments and is further arranged to adjust the level of inverse quantization applied to the sets of quantized transform coefficient values from one segment of a frame to another and to apply an actual level of inverse quantization to the sets of quantized transform coefficients for a particular segment of a frame that is different from the default level of inverse quantization to be used throughout decoding of the encoded digital video sequence. Preferably, the decoder is arranged to determine the actual level of inverse quantization to be used in the particular segment by adding a segment-specific difference value to the default level of inverse quantization, the segment-specific difference value being representative of the difference between the default level of inverse quantization and the actual level of inverse quantization to be used in the particular segment. Preferably, the video decoder is arranged to retrieve an indication of the segment-specific difference value from a bit-stream representative of the encoded digital video sequence.

According to a fifth aspect of the invention, there is provided a multimedia terminal comprising an encoder according the third aspect of the invention.

According to a sixth aspect of the invention, there is provided a multimedia terminal comprising a decoder according to the fourth aspect of the invention.

Preferably, the multimedia terminal according to the fifth and/or sixth aspects of the invention is a mobile multimedia terminal arranged to communicate with a mobile telecommunications network by means of a radio connection.

DETAILED DESCRIPTION OF THE INVENTION

In a preferred embodiment of the invention a video sequence specific quantization parameter (QP) is transmitted and used as a reference when coding and decoding the actual picture/slice quantization parameters. In this way there is no need to transmit a full QP for every picture/slice, but a statistically smaller difference value is transmitted and used to reconstruct the picture/slice QP, thus leading to reduction in transmission bit-rate.

Embodiments of the invention will now be described with reference to FIGS. 5 through 8.

Figure 1:
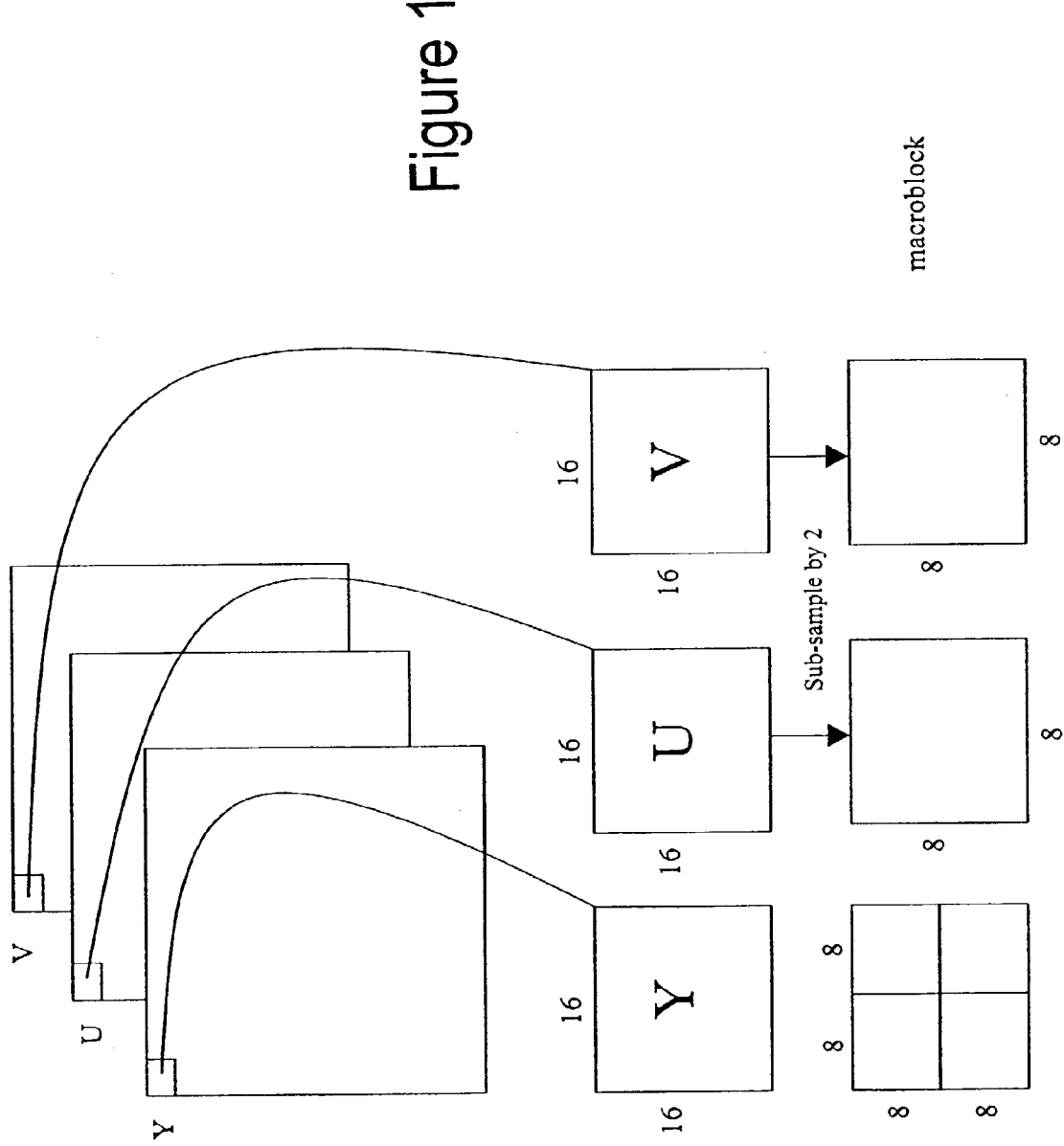
FIG. 1 illustrates the formation of a 16×16 macroblock according to prior art.
Figure 2:
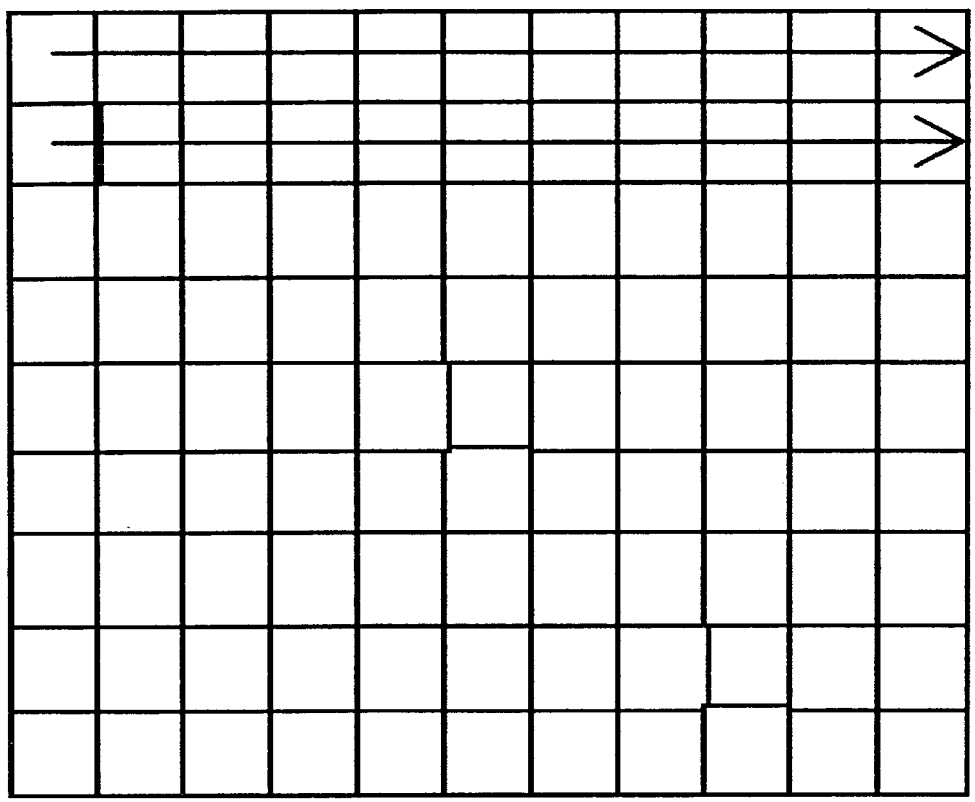
FIG. 2 illustrates subdivision of a QCIF picture into 16×16 macroblocks and grouping of consecutive macroblocks into slices.
Figure 3:
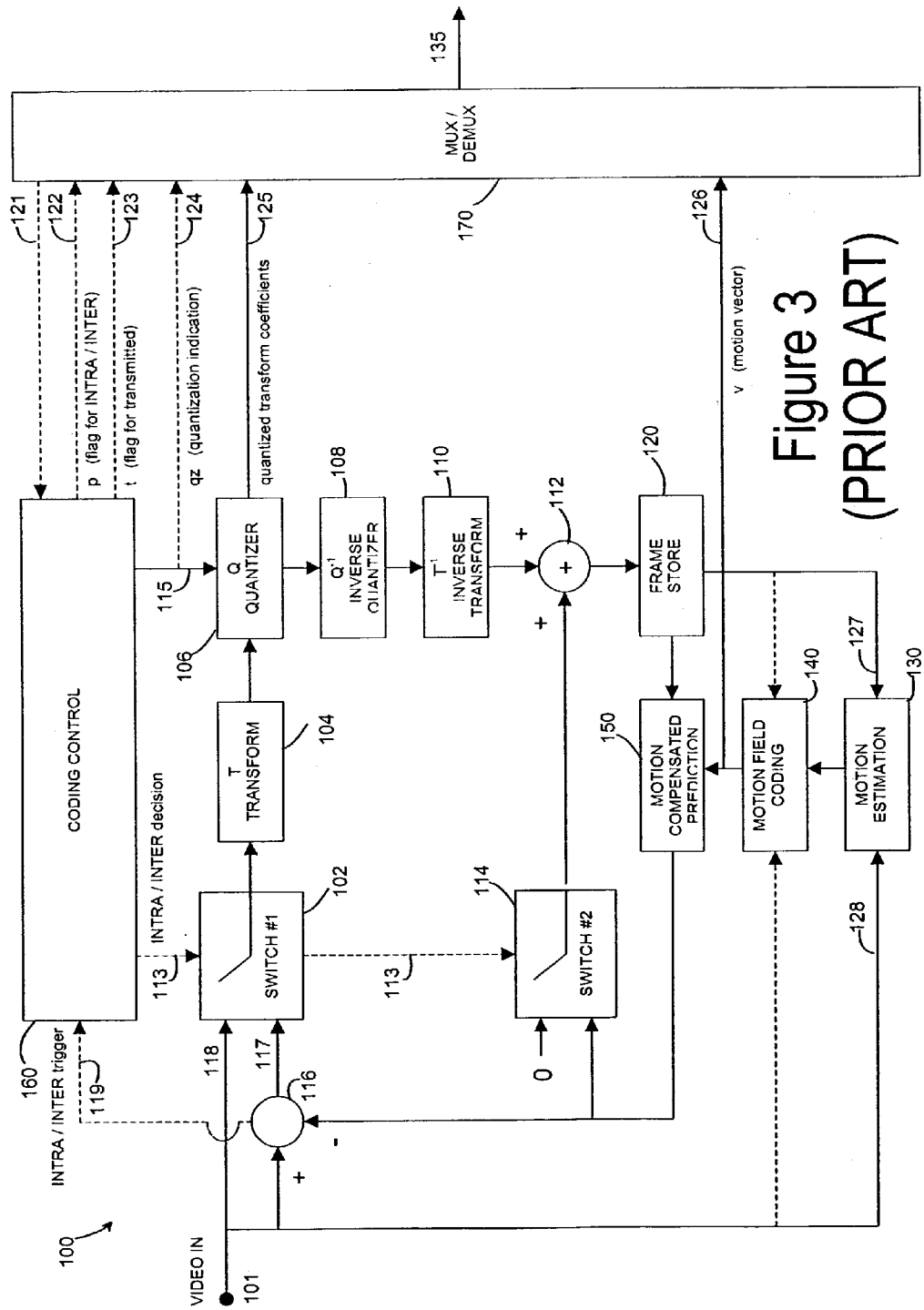
FIG. 3 is a schematic block diagram of a generic video encoder according to prior art.
Figure 5:
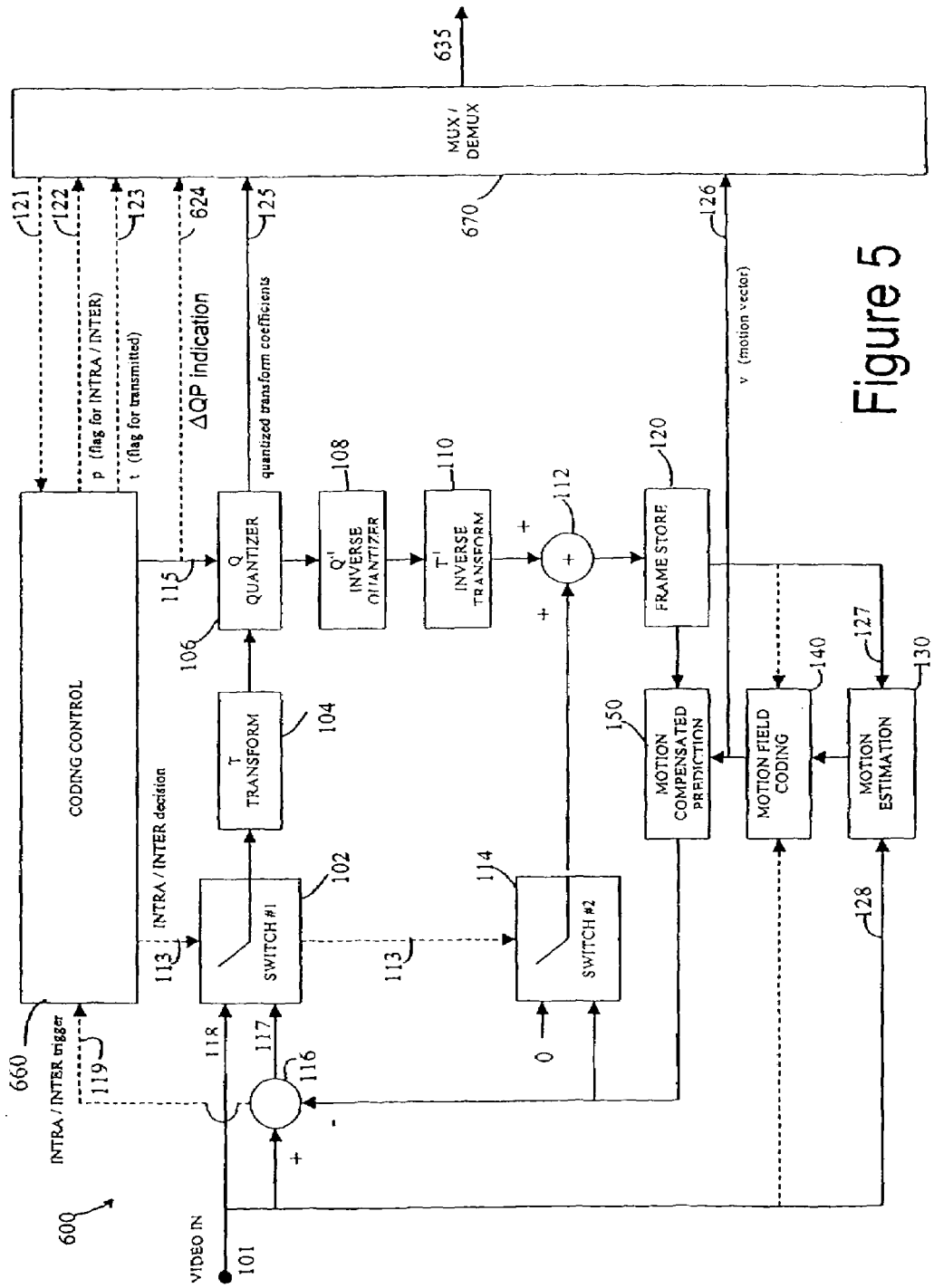
FIG. 5 is a schematic block diagram of a video encoder according to an embodiment of the invention.

FIG. 5 is a schematic block diagram of a video encoder 600 implemented according to the preferred embodiment of the invention. The structure of the video encoder shown in FIG. 5 is substantially identical to that of the prior art video encoder illustrated in FIG. 3, with appropriate modifications to those parts of the encoder that perform operations relating to the quantization of DCT transform coefficients and the signalling of quantization parameter (QP) values used in the video encoding process. All parts of the video encoder that implement functions and operate in a manner identical to the previously described prior art video encoder are identified with identical reference numbers. As the invention is particularly relevant to the signalling of quantization parameter (QP) values at the slice or frame level, it will be assumed throughout the following description that video encoder 600 according to the preferred embodiment of the invention is specifically adapted to apply a video coding method in which the frames of a video sequence to be coded are divided into macroblocks and the macroblocks are further grouped into slices, an indication of the quantization parameter being provided at the beginning of each frame and at the beginning of each new slice within a frame. An example of such a video coding method is the previously cited ITU-T H.26L video coding recommendation, as described in T. Wiegand, "Joint Model Number 1", Doc. JVT-A003, Joint Video Team (JVT) of ISO/IEC MPEG and ITU-T VCEG, January 2002. Alternatively, the method can be applied in a video coding system in which an indication of the quantization parameter is given only at the beginning of a frame. While the following detailed description is written specifically to illustrate application of the method according to the invention in the indication and signalling of slice level quantization parameters, it should be appreciated that the method can applied in an exactly analogous manner to the representation of frame (picture) level quantization parameters.

Operation of video encoder 600 will now be considered in detail. When encoding a digital video sequence, encoder 600 operates in a manner similar to that previously described in connection with FIG. 3 to generate INTRA-coded and INTER-coded compressed video frames. As explained earlier in the text, in INTRA-coding mode, a Discrete Cosine Transform (DCT) is applied to each block of image data (pixel values) in order to produce a corresponding two-dimensional array of transform coefficient values. The DCT operation is performed in transform block 104 and the coefficients thus produced are subsequently passed to quantizer 106, where they are quantized. In INTER-coding mode, the DCT transform performed in block 104 is applied to blocks of prediction error values. The transform coefficients produced as a result of this operation are also passed to quantizer 106 where they too are quantized.

According to the invention, when starting to encode a new video sequence, encoder 600 determines a default or reference level of quantization that is to be used throughout encoding of the video sequence to quantize the DCT coefficient values generated in quantizer 106. Throughout the following description, this default or reference level of quantization will be termed a "sequence level quantization parameter", or SQP for short. The choice of an SQP for a given video sequence is controlled by control manager 660 and, for example, may be based on consideration of the properties of the sequence to be encoded and the bandwidth available for transmission of the encoded bit-stream produced by the encoder.

In the preferred embodiment of the invention, encoder 600 determines SQP as the default or reference level of quantization to be used when operating in INTER-coding mode, i.e. in situations when the DCT coefficients generated in transform block 104 are representative of prediction error values. It should be appreciated that the method according to the invention can also be applied to the quantization of DCT coefficient values produced in traditional INTRA-coding mode utilizing no spatial prediction. However, given the different origins of the transform coefficients in INTRA- and INTER-coding modes (the DCT coefficients produced in INTRA-coding mode are derived from pixel values, while those generated in INTER-coding mode are produced by applying a DCT transform to prediction error values) it is unlikely that a single SQP value can be determined that is optimum for quantization of DCT coefficients in both INTRA- and INTER-coding modes. Therefore, in an embodiment in which the method according to the invention is used in both INTRA- and INTER-coding mode, two SQP values are preferably be used, one that provides the most efficient representation of QP value information in INTRA-coding mode and another that provides the most efficient representation of QP values used during INTER-coding. In all other respects, the method according to the invention may be applied in a directly analogous way in both INTRA-and INTER-coding modes. Of course, in an alternative embodiment, a single SQP value may be defined and used as the sequence level quantization parameter for both INTRA- and INTER-coded frames. This is a practical approach especially in modern video coding systems, such as the one described in T. Wiegand, "Joint Model Number 1", Doc. JVT-A003, Joint Video Team (JVT) of ISO/IEC MPEG and ITU-T VCEG, January 2002, where spatial prediction is applied to the INTRA coded macroblocks before coding the INTRA redirection error with DCT.

It should further be noted that as the majority of frames in a typical video sequence are encoded as INTER frames, the greatest saving in bit-rate is achieved by applying the method according to the invention to the representation of QP values in INTER-coding mode. Thus, in the preferred embodiment of the invention, a single SQP value is used, this value being indicative of a default or reference value of quantization to be used in quantizing DCT coefficients representative of prediction error values in INTER-coding mode.

Having determined the SQP value to be used for the sequence, control manager 660 provides an indication of the selected SQP value via control line 122 to video multiplex coder 670 which, in turn, inserts an indication of the SQP value into the bit-stream 635 of coded image information representative of the video sequence. Preferably, this indication is provided in a sequence header portion of the encoded video bit-stream 635.

Video encoder 600 then starts to encode the video sequence. As explained in connection with the description of prior art video encoder 100, illustrated in FIG. 3, the first frame of the sequence to be encoded is encoded in INTRA-format. As the SQP value defined according to the preferred embodiment of the invention is specific to the quantization of DCT coefficient values produced in INTER-coding mode, operation of encoder 600 in INTRA-coding mode is entirely analogous to that of prior art video encoder 100 and will not be considered in further detail here.

Once encoding of the first frame is complete, control manager 660 switches video encoder 600 into INTER-coding mode. In INTER-coding mode, switch 102 is operated to receive its input from line 117, which comprises the output of combiner 116. Combiner 116 receives the video input signal macroblock by macroblock from input 101 and forms a block of prediction error information for each block of the macroblock. The prediction error information for each block is passed to DCT transformer 104, which performs a two-dimensional discrete cosine transform on each block of prediction error values to produce a two-dimensional array of DCT transform coefficients for the block in question. The transform coefficients for each prediction error block are then passed to quantizer 106 where they are quantized, as previously described, using a quantization parameter QP. The rest of the INTER-coding process continues as previously described in connection with prior art video encoder 100.

As each macroblock is received, control manager 660 determines whether the macroblock currently being processed is the first macroblock of a slice. If it is, the control manager determines a quantization parameter value QP to be used in quantizing the DCT coefficient values generated in DCT transformer 104. It should be noted that it is possible to make an estimation about the QP based on the bit-budget allowed for the frame, bits already spent in the previous slices or the same frame and possibly the bits spent for slices in the previous frame. Having done this, control manager 660 determines a difference ($\Delta QP$) between the previously defined sequence level quantization parameter value SQP and the actual QP value to be used for the slice in question.

It then passes an indication of this difference via control line 624 to video multiplex coder 670, which further includes an indication of the difference value ΔQP in bit-stream 635. Preferably, this indication is provided in a slice header portion of the encoded video bit-stream 635 containing control information specific to the slice in question. This process is repeated until all slices of the current frame have been encoded in INTER-coded format, at which point the video encoder starts to encode the next frame of the video sequence.

Figure 4:
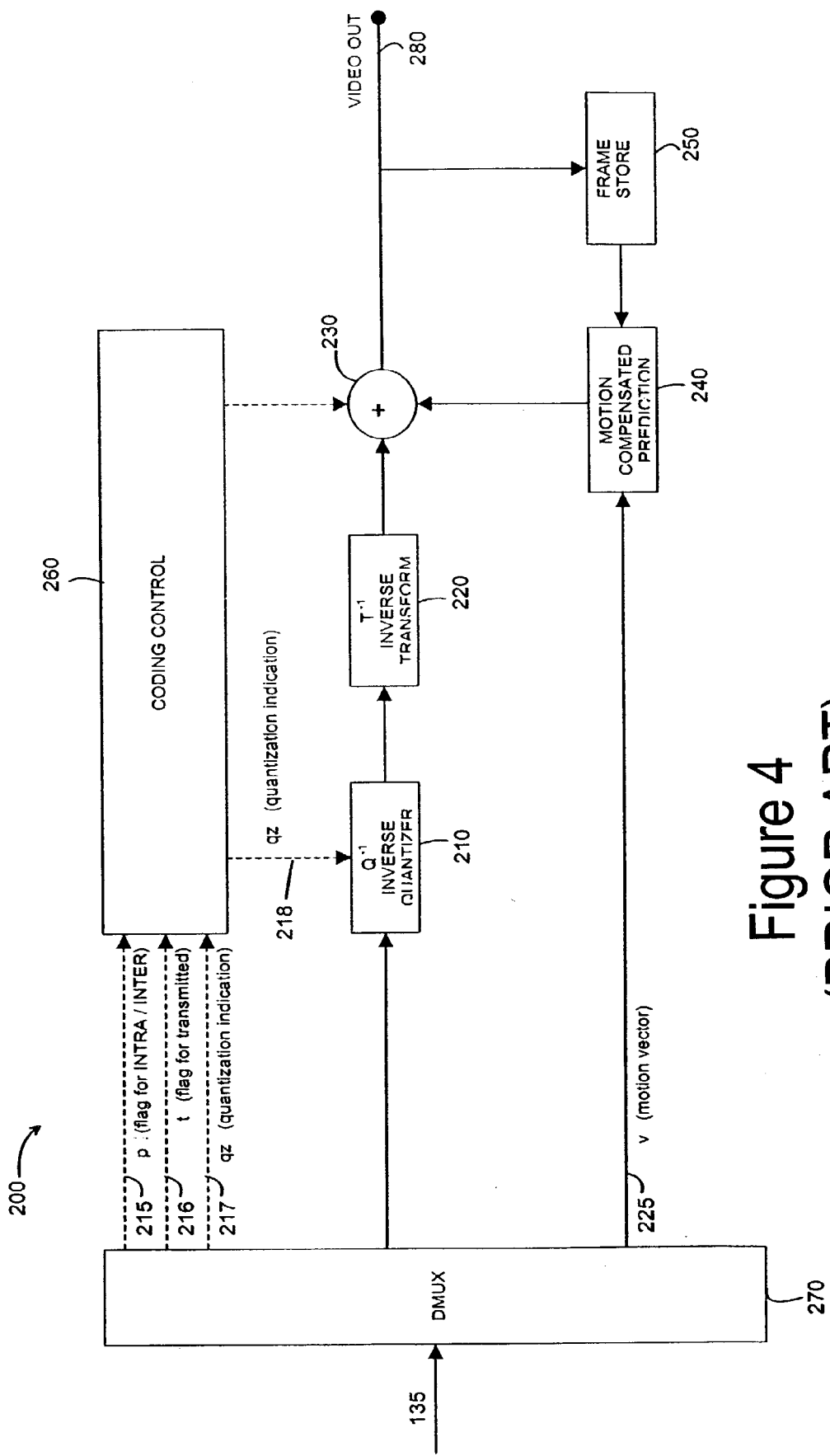
FIG. 4 is a schematic block diagram of a generic video decoder according to prior art and corresponding to the encoder shown in FIG. 3.
Figure 6:
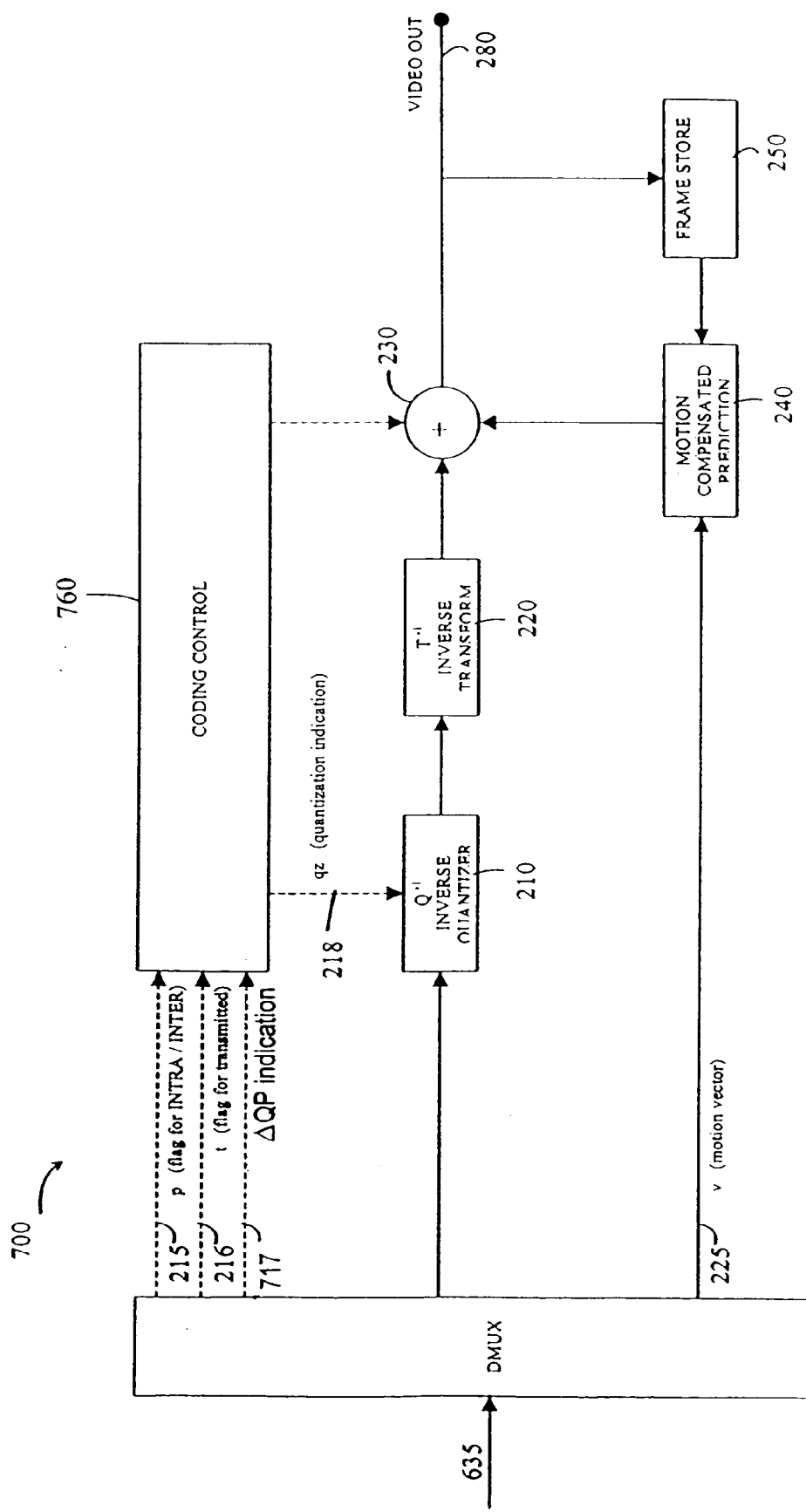
FIG. 6 is a schematic block diagram of a video decoder according to an embodiment of the invention and corresponding to the encoder shown in FIG. 5.

A video decoder 700 implemented according to a preferred embodiment of the invention will now be described with reference to FIG. 6. The structure of the video decoder illustrated in FIG. 6 is substantially identical to that of the prior art video decoder shown in FIG. 4, with appropriate modifications to those parts of the decoder that perform operations relating to the inverse quantization of DCT transform coefficients. All parts of the video decoder that implement functions and operate in a manner identical to the previously described prior art video decoder are identified with identical reference numbers.

Here it is assumed that the video decoder of FIG. 6 corresponds to the encoder described in connection with FIG. 5 and is therefore capable of receiving and decoding the bit-stream 635 transmitted by encoder 600. As previously described, in the preferred embodiment of the invention, encoder 600 determines a sequence level quantization parameter SQP to be used in INTER-coding mode. Correspondingly, decoder 700 is adapted to receive an indication of this SQP value and to use the sequence level quantization parameter SQP in the determination of inverse quantization parameters to be applied to blocks of quantized transform coefficient values (representative of prediction error values) received in the encoded bit-stream for INTER-coded frames. In an alternative embodiment of the invention, the same process may also be applied to quantized transform coefficient values extracted from the bit-stream for INTRA-coded frames. As explained above, in this alternative embodiment, an indication of two SQP values may be provided, one for INTRA-coded frames of the sequence and one for INTER-coded frames. In a further alternative embodiment, a single sequence level quantization parameter may be indicated for frames coded in both INTRA- and INTER-coding modes.

Operation of a video decoder according to the preferred embodiment of the invention will now be described in detail. Decoder 700 receives bit-stream 635 and separates it into its constituent parts. This operation is performed by video multiplex decoder 770.

When starting to decode a new sequence, video multiplex decoder 770 first extracts information and parameters relating to the sequence as a whole from the sequence header portion of the received bit-stream 635. As explained above in connection with the description of encoder 600, according to the preferred embodiment of the invention, the sequence header portion of the bit-stream is modified to contain an indication of the sequence level quantization parameter SQP used in quantization of DCT coefficient values produced in INTER-coding mode. Video multiplex decoder extracts the indication of the SQP value from the bit-stream and, if it was encoded, for example using variable length coding, applies appropriate decoding to recover the SQP value. It then passes the SQP value to the decoder's control manager 760, which stores it in the decoder's memory.

Video decoder 700 then starts to decode the encoded frames of the video sequence, the decoding of each frame commencing as soon as the video decoder starts receiving information relating to the frame in video bit-stream 635. Video multiplex decoder 770 extracts an INTRA/INTER trigger control signal from picture type information associated with each compressed video frame received in the encoded bit-stream 635 and passes it to control manager 760 via control line 215. The control manager 760 controls the operation of the decoder responsive to the INTRA/INTER trigger control signal, so as to switch the decoder into the correct decoding mode.

In the preferred embodiment of the invention, the decoding of frames coded in INTRA-format is performed in a manner analogous to that previously described in connection with the operation of prior art video decoder 200. The decoding of frames encoded in INTER-format, on the other hand, proceeds as described in the following.

When it receives an indication that the next frame to be decoded is an INTER-coded frame, extracted from the received bit-stream by video multiplex decoder 770, control manager 760 switches decoder 700 into INTER-mode. As explained in connection with the description of encoder 600, according to the preferred embodiment of the invention, in which the macroblocks of each frame are grouped into slices, encoded bit-stream 635 comprises certain slice-specific control information, which includes an indication of a slice-specific QP value, represented as a difference value ΔQP with respect to the sequence level quantization parameter SQP. Advantageously, the control information specifically related to each slice is provided in the bit-stream as a header portion specific to the slice in question. On receiving such a portion of the bit-stream, video multiplex decoder extracts the slice-specific control information from the slice header portion of the bit-stream and passes the indication of ΔQP for the slice, retrieved from the bit-stream, to control manager 760 via control line 717.

Next, control manager 760 determines a level of inverse quantization to be applied to the quantized DCT coefficients of the macroblocks in the slice. This is done by combining the ΔQP value for the slice with the sequence specific quantization parameter SQP, previously received and stored in the decoder's memory. As described earlier in the text, the inverse quantization operation performed in the decoder involves multiplying each quantized DCT coefficient by a value equal to the level of quantization originally applied, that is, by the QP value used in the corresponding encoder to quantize the DCT coefficients. Thus, according to the preferred embodiment of the invention, control manager 760 determines the level of inverse quantization for the macroblocks of the slice by adding the received ΔQP value for the slice to SQP. It then passes this value to inverse quantizer 210 via control line 218.

As encoded information for each macroblock of the slice is received in the bit-stream 635, video multiplex decoder 770 separates the encoded prediction error information for each block of the macroblock from encoded motion vector information. It reconstructs the quantized DCT transform coefficients representative of the prediction error values for each block and passes them to inverse quantizer 210. Inverse quantizer 210 then inverse quantises the quantized DCT coefficients according to the slice QP constructed from the ΔQP and SQP values by control manager 760. It then provides the inverse quantized DCT coefficients to inverse DCT transformer 220. The rest of the decoding process continues as previously described in connection with prior art video decoder 200.

The steps of receiving a slice-specific ΔQP value, combining ΔQP with SQP and inverse quantizing the qauntized DCT coefficients for each block of the macroblocks within the slice is repeated for each slice of the frame until all slices of the current INTER-coded frame have been decoded. At this point video encoder 700 starts decoding the next frame of the encoded video sequence.

Figure 7:
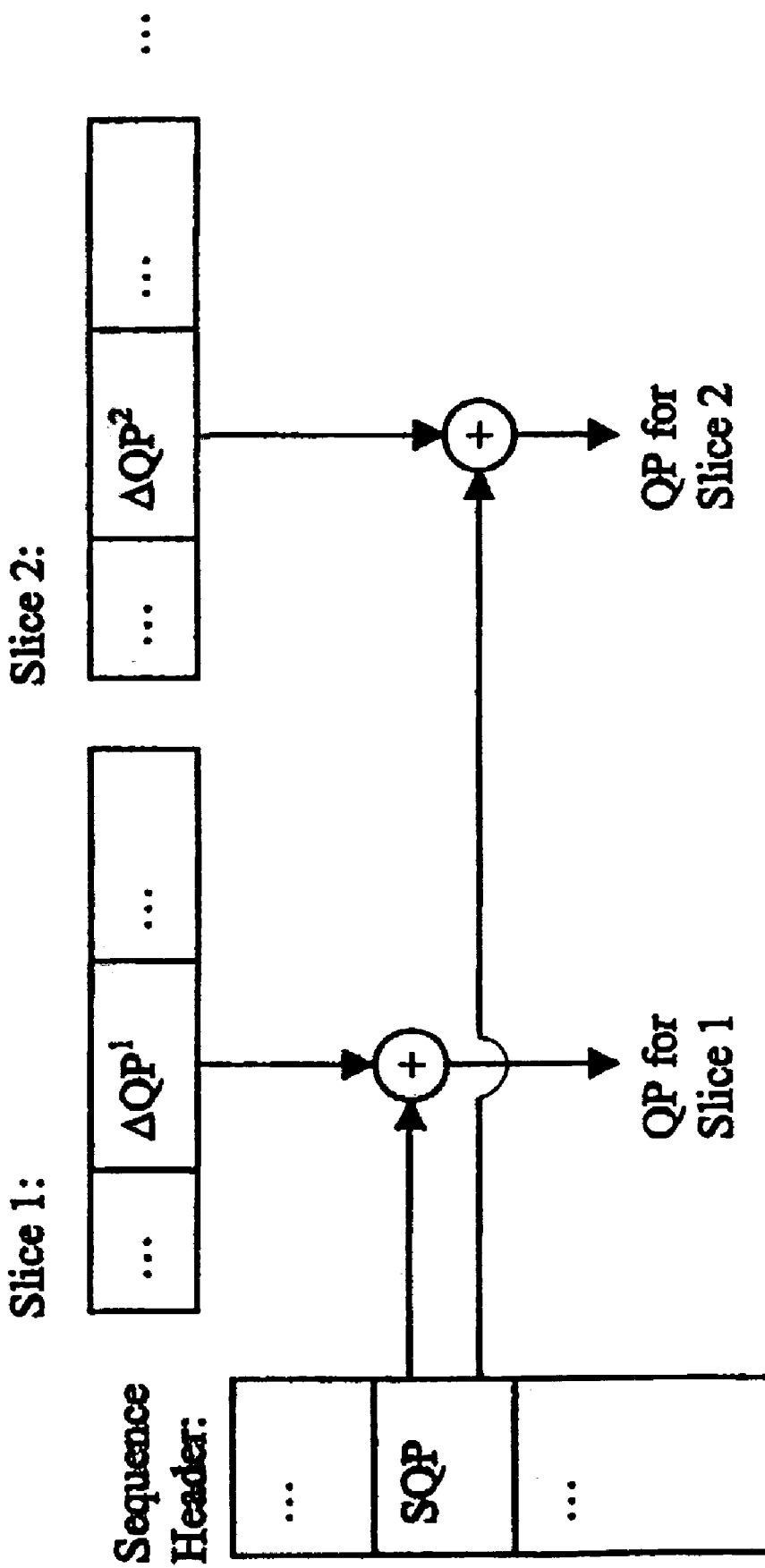
FIG. 7 illustrates a decoding process according to one possible embodiment of the invention. Quantization parameters (QP) for each slice are obtained by adding the Sequence QP (SQP) to slice specific difference QP values ($\Delta QP''$).

FIG. 7 illustrates the way in which slice-specific QP values are reconstructed according to the preferred embodiment of the invention. As can be seen from the figure, the process comprises the steps of:

1. retrieving a sequence level quantization parameter (SQP);
2. retrieving a picture or slice level difference quantization parameter (ΔQP);
3. adding the difference quantization parameters to the sequence level quantization parameter to obtain the quantization parameters for a picture or a slice;
4. constructing the received prediction error-coding coefficients by means of said picture or slice quantization parameter.

Figure 8:
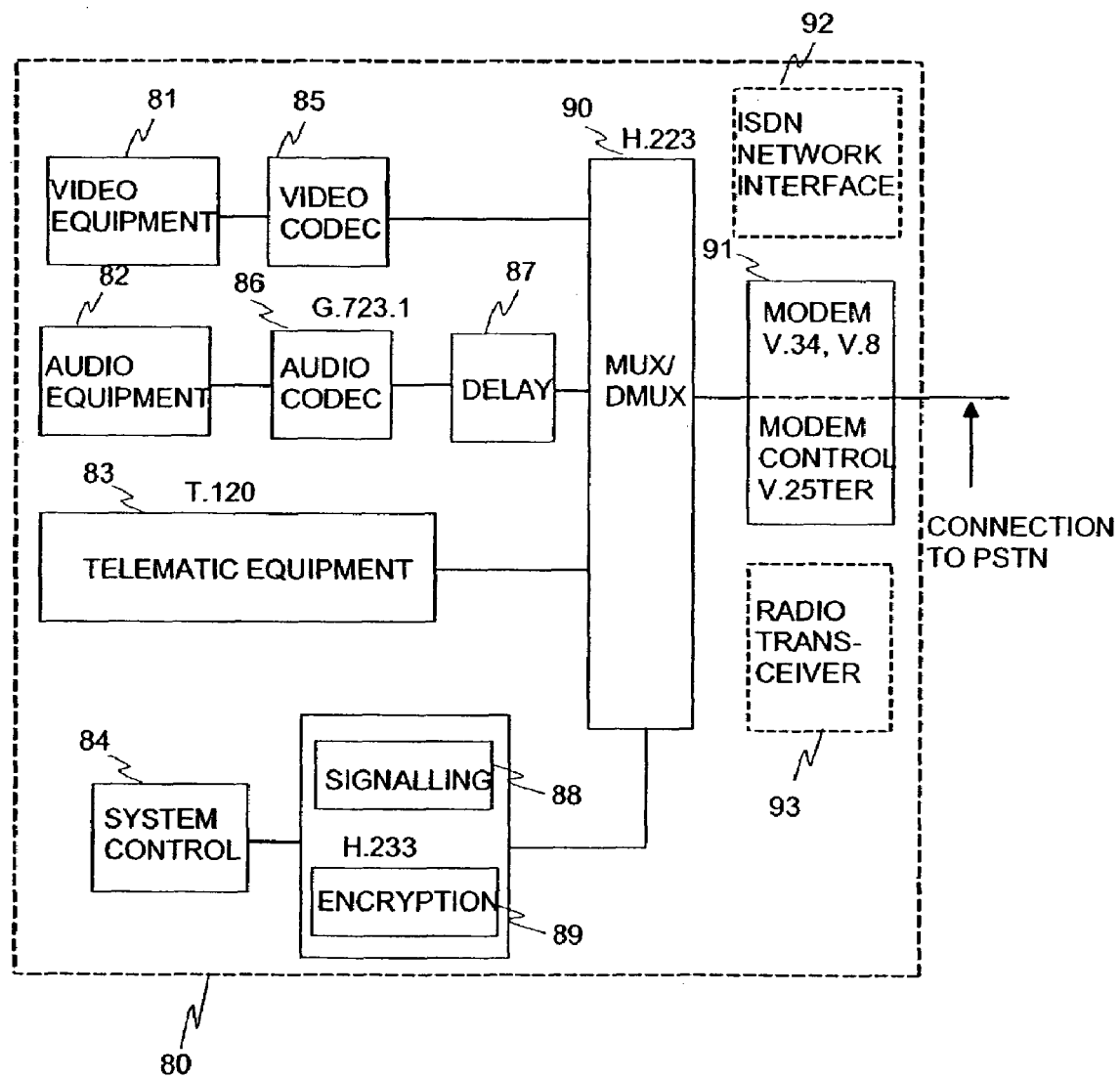
FIG. 8 is a schematic block diagram of a multimedia communications terminal in which the method according to the invention may be implemented.

FIG. 8 presents a terminal device comprising video encoding and decoding equipment which may be adapted to operate in accordance with the present invention. More precisely, the figure illustrates a multimedia terminal 80 implemented according to ITU-T recommendation H.324. The terminal can be regarded as a multimedia transceiver device. It includes elements that capture, encode and multiplex multimedia data streams for transmission via a communications network, as well as elements that receive, de-multiplex, decode and display received multimedia content. ITU-T recommendation H.324 defines the overall operation of the terminal and refers to other recommendations that govern the operation of its various constituent parts. This kind of multimedia terminal can be used in real-time applications such as conversational videotelephony, or non real-time applications such as the retrieval and/or streaming of video clips, for example from a multimedia content server in the Internet.

In the context of the present invention, it should be appreciated that the H.324 terminal shown in FIG. 8 is only one of a number of alternative multimedia terminal implementations suited to application of the inventive method. It should also be noted that a number of alternatives exist relating to the location and implementation of the terminal equipment. As illustrated in FIG. 8, the multimedia terminal may be located in communications equipment connected to a fixed line telephone network such as an analogue PSTN (Public Switched Telephone Network). In this case the multimedia terminal is equipped with a modem 91, compliant with ITU-T recommendations V.8, V.34 and optionally V.8bis. Alternatively, the multimedia terminal may be connected to an external modem. The modem enables conversion of the multiplexed digital data and control signals produced by the multimedia terminal into an analogue form suitable for transmission over the PSTN. It further enables the multimedia terminal to receive data and control signals in analogue form from the PSTN and to convert them into a digital data stream that can be demultiplexed and processed in an appropriate manner by the terminal.

An H.324 multimedia terminal may also be implemented in such a way that it can be connected directly to a digital fixed line network, such as an ISDN (Integrated Services Digital Network). In this case the modem 91 is replaced with an ISDN user-network interface. In FIG. 8, this ISDN user-network interface is represented by alternative block 92.

H.324 multimedia terminals may also be adapted for use in mobile communication applications. If used with a wireless communication link, the modem 91 can be replaced with any appropriate wireless interface, as represented by alternative block 93 in FIG. 8. For example, an H.324/M multimedia terminal can include a radio transceiver enabling connection to the current $2^{nd}$ generation GSM mobile telephone network, or the proposed $3^{rd}$ generation UMTS (Universal Mobile Telephone System).

It should be noted that in multimedia terminals designed for two-way communication, that is for transmission and reception of video data, it is advantageous to provide both a video encoder and video decoder implemented according to the present invention. Such an encoder and decoder pair is often implemented as a single combined functional unit, referred to as a "codec".

A typical H.324 multimedia terminal will now be described in further detail with reference to FIG. 8.

The multimedia terminal 80 includes a variety of elements referred to as "terminal equipment". This includes video, audio and telematic devices, denoted generically by reference numbers 81, 82 and 83, respectively. The video equipment 81 may include, for example, a video camera for capturing video images, a monitor for displaying received video content and optional video processing equipment. The audio equipment 82 typically includes a microphone, for example for capturing spoken messages, and a loudspeaker for reproducing received audio content. The audio equipment may also include additional audio processing units. The telematic equipment 83, may include a data terminal, keyboard, electronic whiteboard or a still image transceiver, such as a fax unit.

The video equipment 81 is coupled to a video codec 85. The video codec 85 comprises a video encoder 600 and a corresponding video decoder 700 both implemented according to the invention (see FIGS. 5 and 6). The video codec 85 is responsible for encoding captured video data in an appropriate form for further transmission over a communications link and decoding compressed video content received from the communications network. In the example illustrated in FIG. 8, the video codec is implemented according to ITU-T recommendation H.26L, with appropriate modifications to implement the method according to the invention in both the encoder and the decoder of the video codec.

The terminal's audio equipment is coupled to an audio codec, denoted in FIG. 8 by reference number 86. Like the video codec, the audio codec comprises an encoder/decoder pair. It converts audio data captured by the terminal's audio equipment into a form suitable for transmission over the communications link and transforms encoded audio data received from the network back into a form suitable for reproduction, for example on the terminal's loudspeaker. The output of the audio codec is passed to a delay block 87. This compensates for the delays introduced by the video coding process and thus ensures synchronisation of audio and video content.

The system control block 84 of the multimedia terminal controls end-to-network signalling using an appropriate control protocol (signalling block 88) to establish a common mode of operation between a transmitting and a receiving terminal. The signalling block 88 exchanges information about the encoding and decoding capabilities of the transmitting and receiving terminals and can be used to enable the various coding modes of the video encoder. The system control block 84 also controls the use of data encryption. Information regarding the type of encryption to be used in data transmission is passed from encryption block 89 to the multiplexer/de-multiplexer (MUX/DMUX unit) 90.

During data transmission from the multimedia terminal, the MUX/DMUX unit 90 combines encoded and synchronised video and audio streams with data input from the telematic equipment 83 and possible control data, to form a single bit-stream. Information concerning the type of data encryption (if any) to be applied to the bit-stream, provided by encryption block 89, is used to select an encryption mode. Correspondingly, when a multiplexed and possibly encrypted multimedia bit-stream is being received, MUX/DMUX unit 90 is responsible for decrypting the bit-stream, dividing it into its constituent multimedia components and passing those components to the appropriate codec(s) and/or terminal equipment for decoding and reproduction.

If the multimedia terminal 80 is a mobile terminal, that is, if it is equipped with a radio transceiver 93, it will be understood by those skilled in the art that it may also comprise additional elements. In one embodiment it comprises a user interface having a display and a keyboard, which enables operation of the multimedia terminal 80 by a user, a central processing unit, such as a microprocessor, which controls the blocks responsible for different functions of the multimedia terminal, a random access memory RAM, a read only memory ROM, and a digital camera. The microprocessor's operating instructions, that is program code corresponding to the basic functions of the multimedia terminal 80, is stored in the read-only memory ROM and can be executed as required by the microprocessor, for example under control of the user. In accordance with the program code, the microprocessor uses the radio transceiver 93 to form a connection with a mobile communication network, enabling the multimedia terminal 80 to transmit information to and receive information from the mobile communication network over a radio path.

The microprocessor monitors the state of the user interface and controls the digital camera. In response to a user command, the microprocessor instructs the camera to record digital images into the RAM. Once an image is captured, or alternatively during the capturing process, the microprocessor segments the image into image segments (for example macroblocks) and uses the encoder to perform motion compensated encoding of the segments in order to generate a compressed image sequence, as explained in the foregoing description. A user may command the multimedia terminal 80 to display the captured images on its display or to send the compressed image sequence using the radio transceiver 93 to another multimedia terminal, a video telephone connected to a fixed line network (PSTN) or some other telecommunications device. In a preferred embodiment, transmission of image data is started as soon as the first segment is encoded so that the recipient can start a corresponding decoding process with a minimum delay.

Although described in the context of particular embodiments, it will apparent to those skilled in the art that a number of modifications and various changes to these teachings may be made. Thus, while the invention has been particularly shown and described with respect to one or more preferred embodiments thereof, it will be understood by those skilled in the art that certain modifications or changes may be made therein without departing from the scope and spirit of the invention as set forth above.

In particular, according to a second possible embodiment of the invention, a sequence QP is not transmitted but an application specific constant is used as sequence QP instead.

In a third possible embodiment of the invention the sequence QP can be updated depending on the changing characteristics of the video sequence if a reliable way of transmitting the new sequence QP is available. The updated SQP value can be either included in the encoded bit-stream representative of the video sequence or can be transmitted directly from encoder to decoder in an associated control channel.

In a fourth possible embodiment of the invention, if QP is constant for the whole video sequence only the value of the sequence QP is transmitted together with the information that it should be used as the QP for all the pictures/slices.

What is claimed is:

1. A method of decoding an encoded digital video sequence for use in a video decoding application to produce a decoded digital video sequence, the digital video sequence comprising a number of frames, each frame of said sequence comprising an array of pixels divided into a plurality of blocks, each block comprising a certain number of said pixels, frames of the digital video sequence encoded by:
    applying motion compensated prediction to blocks of pixels for producing corresponding blocks of prediction error values;
    applying a transform coding technique to said blocks of prediction error valves to produce sets of transform coefficient values representative of said blocks of prediction error values; and
    applying a level of quantization to said sets of transform coefficient values to yield sets of quantized transform coefficient values representative of said blocks of prediction error values, wherein an indication of said level of quantization is provided in the encoded bit-stream including the encoded digital video sequence, said decoding method comprising:
    selecting a default level of inverse quantization for use in decoding of the encoded digital video sequence to inverse quantize the sets of quantized transform coefficient values, said default level selected based on the indication of said level of quantization provided in the encoded bit-stream.

2. A video decoder according to claim 1, wherein said default level of inverse quantization is specific to the encoded video sequence being decoded.

3. A decoding method according to claim 1, wherein said default level of inverse quantization is specific to the video decoding application.

4. A decoding method according to claim 1, wherein said level of quantization is updated in said yielding of said sets of quantized transform coefficient values, said decoding method further comprising the step of updating the default level of inverse quantization in response to the updated level of quantization.

5. A video decoder for decoding an encoded digital video sequence to produce a decoded digital video sequence, the digital video sequence comprising a number of frames, each frame of said sequence comprising an array of pixels divided into a plurality of blocks, each block comprising a certain number of said pixels, frames of the digital video sequence encoded by:
    applying motion compensated prediction to blocks of pixels for producing corresponding blocks of prediction error values;
    applying a transform coding technique to said blocks of prediction error values to produce sets of transform coefficient values representative of said blocks of prediction error values; and
    applying a level of quantization to said sets of transform coefficient values to yield sets of quantized transform coefficient values representative of said blocks of prediction error values, wherein an indication of said level of quantization is provided in the encoded bit-stream including the encoded digital video sequence, said video decoder comprising:

means for retrieving the encoded digital video sequence from the encoded bit-stream; and means for selecting a default level of inverse quantization for use in decoding of the encoded digital video sequence to inverse quantize the sets of quantized transform coefficient values, said default level of inverse quantization selected based on said indication of said level of quantization provided in the encoded bit-stream.

6. A video decoder according to claim 5, wherein said default level of inverse quantization is specific to the encoded video sequence being decoded.

7. A video decoder to claim 5, wherein said level of quantization is updated in said yielding of said sets of quantized transform coefficient values, said video decoder arranged to update the default level of inverse quantization in response to the updated level of quantization.

8. A video decoder according to claim 5, provided in a multimedia terminal.

9. A video decoder according to claim 5, provided in a radio telecommunications device.

10. A video decoder for decoding an encoded digital video sequence to produce a decoded digital video sequence, the digital video sequence comprising a number of frames, each frame of said sequence comprising an array of pixels divided into a plurality of blocks, each block comprising a certain number of said pixels, frames of the digital video sequence encoded by:

applying motion compensated prediction to blocks of pixels for producing corresponding blocks of prediction error values;

applying a transform coding technique to said blocks of prediction error values to produce sets of transform coefficient values representative of said blocks of prediction error values; and applying a level of quantization to said sets of transform coefficient values to yield sets of quantized transform coefficient values representative of said blocks of prediction error values, wherein an indication of said level of quantization is provided in the encoded bit-stream including the encoded digital video sequence, said video decoder comprising:

a module for retrieving the encoded digital video sequence from the encoded bit-stream; and a module for selecting a default level of inverse quantization for use in decoding of the encoded digital video sequence to inversely quantize the sets of quantized transform coefficient values, said default level of inverse quantization selected based on said indication of said level of quantization provided in the encoded bit-stream.

* * * * *

UNITED STATES PATENT AND TRADEMARK OFFICE
CERTIFICATE OF CORRECTION

PATENT NO. : 7,263,125 B2
APPLICATION NO. : 10/421629
DATED : August 28, 2007
INVENTOR(S) : Lainema It is certified that error appears in the above-identified patent and that said Letters Patent is hereby corrected as shown below:

In column 26, line 38, claim 2, line 1, "video decoder" should be --decoding method--.

In column 27, line 16, claim 7, line 1, after "decoder", --according-- should be inserted.

Signed and Sealed this

Seventh Day of October, 2008

JON W. DUDAS
*Director of the United States Patent and Trademark Office*